United States Patent
Miyake et al.

(10) Patent No.: US 8,604,107 B2
(45) Date of Patent: Dec. 10, 2013

(54) FLAME-RETARDANT POLYCARBONATE RESIN COMPOSITION

(75) Inventors: Toshiyuki Miyake, Chiyoda-ku (JP);
Masami Kinoshita, Chiyoda-ku (JP);
Mizuho Saito, Chiyoda-ku (JP);
Katsuhiko Hironaka, Chiyoda-ku (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 12/602,571

(22) PCT Filed: May 28, 2008

(86) PCT No.: PCT/JP2008/060245
§ 371 (c)(1),
(2), (4) Date: Dec. 1, 2009

(87) PCT Pub. No.: WO2008/149872
PCT Pub. Date: Dec. 11, 2008

(65) Prior Publication Data
US 2010/0184884 A1    Jul. 22, 2010

(30) Foreign Application Priority Data

Jun. 1, 2007   (JP) ................................. 2007-147057
Jun. 1, 2007   (JP) ................................. 2007-147058

(51) Int. Cl.
*C08K 3/32*   (2006.01)

(52) U.S. Cl.
USPC ........... 524/116; 523/452; 524/115; 524/147; 524/117; 524/415

(58) Field of Classification Search
USPC ......................... 524/115, 147, 117
See application file for complete search history.

(56) References Cited

U.S. PATENT DOCUMENTS

| | | | |
|---|---|---|---|
| 5,521,230 A * | 5/1996 | Bhatia et al. ................. | 523/328 |
| 5,643,980 A * | 7/1997 | Shindoh et al. ............... | 524/100 |
| 2004/0254270 A1 | 12/2004 | Harashina | |
| 2006/0069228 A1* | 3/2006 | McCloskey et al. .......... | 528/196 |
| 2006/0149024 A1* | 7/2006 | Ono et al. ...................... | 528/196 |
| 2006/0247343 A1* | 11/2006 | Kishimoto et al. ........... | 524/117 |

FOREIGN PATENT DOCUMENTS

| | | | |
|---|---|---|---|
| CN | 1599776 A | | 3/2005 |
| EP | 1 566 396 | * | 8/2005 |
| GB | 1079686 | | 8/1967 |
| JP | 9-268236 A | | 10/1997 |
| JP | 2003-292603 A | | 10/2003 |
| WO | 2004111106 A1 | | 12/2004 |
| WO | 2007/013463 A1 | | 2/2007 |

OTHER PUBLICATIONS

Masahiko Okada et al, Biodegradable Polymers Based on Renewable Resources VI. Synthesis and Biodegradability of Poly(estercarbonate)s Containing 1,4:3,6-Dianhydro-D-Glucitol and Sebacic Acid Units, "Journal of Applied Polymer Science", (2002), pp. 872-880, vol. 86.

Hans R. Kricheldorf et al., Polymers of Carbonic Acid. 22. Cholesteric Polycarbonates Derived from (S)-((2-Methybutyl)thio)hydroquinone or Isosorbide, "Macromolecules", 1996, pp. 8077-8082, vol. 29.

Translation of International Preliminary Report on Patentability corresponding to PCT/JP2008/060245 filed May 28, 2008.

* cited by examiner

*Primary Examiner* — Doris Lee
(74) *Attorney, Agent, or Firm* — Sughrue Mion, PLLC (57) ABSTRACT

There is provided a resin composition that comprises a polycarbonate resin derived from an ether diol such as isosorbide and that is excellent in flame retardancy, heat resistance, thermal stability, rigidity, transparency and moldability. The resin composition is a flame-retardant resin composition comprising 1 to 60 parts by weight of phosphorus compound (component B) having a thermal decomposition temperature of not higher than 340° C. based on 100 parts by weight of polycarbonate resin (component A) that mainly comprises a recurring unit represented by the following formula (1)

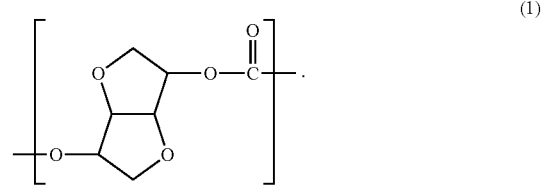

8 Claims, 3 Drawing Sheets

FLAME-RETARDANT POLYCARBONATE RESIN COMPOSITION

TECHNICAL FIELD

The present invention relates to a resin composition comprising a polycarbonate resin. More specifically, it relates to a resin composition having excellent flame retardancy and comprising a polycarbonate resin derived from sugar which is a biogenic matter.

BACKGROUND OF THE ART

Polycarbonate resins are polymers in which aromatic or aliphatic dioxy compounds are connected to each other by a carbonate ester. Inter alia, a polycarbonate resin (hereinafter may be referred to as "PC-A") obtained from 2,2-bis(4-hydroxyphenyl) propane (commonly known as "bisphenol A") is excellent in not only transparency and heat resistance but also mechanical properties such as impact resistance and is therefore used in various fields.

The polycarbonate resins are generally produced by use of raw materials obtained from oil resources. However, since depletion of the oil resources has been concerned, production of polycarbonate resins using raw materials obtained from biogenic matters such as plants has been demanded. For example, an ether diol represented by the following formula (a):

(a)

is easily produced from sugar and starch, and three stereoisomers thereof are known. Specific examples thereof include 1,4:3,6-dianhydro-D-sorbitol (hereinafter referred to as "isosorbide") represented by the following formula (b):

(b)

1,4:3,6-dianhydro-D-mannitol (hereinafter referred to as "isomannide") represented by the following formula (c):

(c)

and 1,4:3,6-dianhydro-L-iditol (hereinafter referred to as "isoidide") represented by the following formula (d).

(d)

The isosorbide, isomannide and isoidide are obtained from D-glucose, D-mannose and L-idose, respectively. For example, in the case of the isosorbide, it can be obtained by hydrogenating D-glucose and then dehydrating it by use of an acid catalyst.

Of the above ether diols, incorporation of the isosorbide in particular as a monomer into a polycarbonate has heretofore been studied.

For example, Patent Literature 1 proposes a homopolycarbonate resin having a melting point of 203° C. and produced by use of a melt transesterification method. Non-patent Literature 1 proposes a homopolycarbonate resin produced by a melt transesterification method using zinc acetate as a catalyst and having a glass transition temperature of 166° C. and a thermal decomposition temperature (5% weight reduction temperature) of about 283° C. Non-patent Literature 2 proposes a homopolycarbonate resin produced by interfacial polymerization using bischloroformate of isosorbide and having a glass transition temperature of about 144° C. Patent Literature 2 proposes a polycarbonate resin produced by use of a tin catalyst and having a glass transition temperature of at least 170° C. Patent Literature 3 proposes a copolymerized polycarbonate resin from isosorbide and a straight-chain aliphatic diol.

When application of these polycarbonate resins comprising isosorbide to industrial applications such as components for electric/electronic devices, components for OA equipment and automobile parts is considered, flame retardancy thereof must be studied. For example, the flame retardancy level according to UL-94 standard of a molded article having a thickness of 1.6 mm and made of a homopolycarbonate resin comprising isosorbide is not-V, and it needs an improvement in flame retardancy.

The polycarbonate resin comprising isosorbide has a different structure from that of a known bisphenol-A-type aromatic polycarbonate resin. Therefore, it is considered that its combustion mechanism is also different from a combustion mechanism proposed for the bisphenol-A-type aromatic polycarbonate resin, i.e. one in which a carbonized film is formed through intramolecular rearrangement and isomerization. Further, the polycarbonate resin comprising isosorbide also differs from the known bisphenol-A-type polycarbonate resin in compatibility with a flame retardant.

Accordingly, not all flame retardants used in the aromatic polycarbonate resin can be directly used in the polycarbonate resin comprising isosorbide, and alternative flame retardants must be studied.

(Patent Literature 1) Specification of UK Patent Application Laid-Open No. 1,079,686
(Patent Literature 2) Pamphlet of International Publication No. 2007/013463
(Patent Literature 3) Pamphlet of International Publication No. 2004/111106
(Non-patent Literature 1) "Journal of Applied Polymer Science", 2002, Vol. 86, pp. 872 to 880
(Non-patent Literature 2) "Macromolecules", 1996, Vol. 29, pp. 8,077 to 8,082

DISCLOSURE OF THE INVENTION

Thus, an object of the present invention is to provide a resin composition which comprises a polycarbonate resin derived from an ether diol such as isosorbide and which has excellent flame retardancy. Another object of the present invention is to provide a resin composition that is excellent in heat resistance, thermal stability, rigidity, transparency and moldability. Another object of the present invention is to provide a molded article comprising the resin composition.

The present inventor has found that primarily when the ether diol represented by the above formula (a) is melt-polymerized in the presence of a specific catalyst, a polycarbonate resin having a 5% weight reduction temperature (Td) of higher than 300° C. and thermal stability that has heretofore not been achieved is obtained.

Further, the present inventor has also found that this polycarbonate resin has good compatibility with a specific phosphorus compound and provides a resin composition having excellent flame retardancy. Further, the present inventor has also found that the resin composition to be obtained is also excellent in heat resistance, thermal stability, rigidity, transparency and moldability. The present invention is based on these findings.

That is, the present invention is a flame-retardant resin composition comprising 1 to 60 parts by weight of phosphorus compound (component B) having a thermal decomposition temperature of not higher than 340° C. based on 100 parts by weight of polycarbonate resin (component A) that primarily comprises a recurring unit represented by the following formula (1).

(1)

The present invention includes a resin composition comprising 1 to 30 parts by weight of organophosphorus compound (B-1) represented by the following formula (2):

(2)

wherein $R^1$, $X^1$ and $X^2$ each independently represent a hydrogen atom, an alkyl group having 1 to 10 carbon atoms, an alkoxy group having 1 to 10 carbon atoms, an aryl group having 6 to 15 carbon atoms, an aryloxy group having 6 to 15 carbon atoms, an aralkyl group having 7 to 20 carbon atoms or an aralkyloxy group having 7 to 20 carbon atoms, and $X^1$ and $X^2$ may bond to each other and form a ring with adjacent phosphorus atoms.

Further, the present invention includes a resin composition comprising 10 to 60 parts by weight of phosphate compound (B-2) containing a nitrogen atom and 0.01 to 5 parts by weight of drip inhibitor (component C) based on 100 parts by weight of polycarbonate resin (component A).

In addition, the present invention includes molded articles comprising the above resin compositions.

DESCRIPTION OF SYMBOLS 1. molded article body simulating a notebook-size personal computer housing
2. matte surface
3. mirror surface
4. gate (pin gate 0.8 mm φ, 5 gates in total)
5. portion of which a sample for measuring chemical resistance and hydrolysis resistance is cut out
6. ribbed boss (for the back side of the mirror surface)
7. ribbed boss (for the backside of the matte surface)
8. molded article body
9. pin side gate (side gate width: 5 mm, gate thickness: 1.2 mm, gate land length: 6 mm, side gate tab: 8 mm in width× 15 mm in length, diameter of pin gate to tab: 1.8 mm)
10. portion of which a sample for measuring chemical resistance and hydrolysis resistance is cut out
11. molded article body
12. spool and runner
13. gate
14. portion of which a sample for measuring chemical resistance and hydrolysis resistance is cut out

BEST MODE FOR CARRYING OUT THE INVENTION

Hereinafter, the present invention will be described in detail.

<Resin Composition>
(Polycarbonate Resin: Component A)

The polycarbonate resin (component A) used in the present invention mainly comprises the recurring unit represented by the formula (1). The content of the recurring unit represented by the formula (1) is preferably not less than 70 mol %, more preferably not less than 80 mol %, much more preferably not less than 90 mol %, further preferably not less than 95 mol %, particularly preferably not less than 98 mol %, based on all recurring units. The upper limit of the content is 100 mol %.

The polycarbonate resin (component A) is most suitably a homopolycarbonate resin comprising only the recurring unit of the formula (1).

The recurring unit represented by the formula (1) is preferably a recurring unit derived from isosorbide(1,4:3,6-dianhydro-D-sorbitol).

The polycarbonate resin (component A) may comprise a recurring unit other than the recurring unit represented by the formula (1). Illustrative examples of the other recurring unit include a recurring unit derived from an aliphatic diol or aromatic bisphenol.

Illustrative examples of the aliphatic-diol-derived recurring unit include recurring units derived from a straight-chain alkane diol, cycloalkane diol and the like. The straight-chain alkane diol may be a recurring unit represented by the following formula (2):

(2)

(wherein m is an integer of 1 to 10)
Specific examples of the straight-chain alkane diol include ethylene glycol, 1,3-propanediol, 1,4-butanediol, 1,5-pentanediol, and 1,6-hexanediol. Specific examples of the cycloalkane diol include cyclohexane diol and cyclohexane dimethanol. Of these, 1,3-propanediol, 1,4-butanediol, hexane diol and cyclohexane dimethanol are preferred.

Illustrative examples of the aromatic-bisphenol-derived recurring unit include recurring units derived from 2,2-bis(4-hydroxyphenyl)propane (commonly known as "bisphenol A"), 1,1-bis(4-hydroxyphenyl)cyclohexane, 1,1-bis(4-hydroxyphenyl)-3,3,5-trimethylcyclohexane, 4,4'-(m-phenylenediisopropylidene)diphenol, 9,9-bis(4-hydroxy-3-methylphenyl)fluorene, 2,2-bis(4-hydroxy-3-methylphenyl)propane, 2,2-bis(4-hydroxyphenyl)-4-methylpentane, 1,1-bis(4-hydroxyphenyl)decane, and 1,3-bis{2-(4-hydroxyphenyl)propyl}benzene.

Illustrative examples of the other recurring unit further include units derived from aromatic diols such as dimethanol benzene and diethanol benzene.

The content of the other recurring unit is preferably not higher than 30 mol %, more preferably not higher than 20 mol %, much more preferably not higher than 10 mol %, further preferably not higher than 5 mol %, particularly preferably not higher than 2 mol %, based on all recurring units.

(Terminal Group)

The polycarbonate resin (component A) may comprise a terminal group represented by the following formula (5) or (6).

—O—R⁴ (5)

(6)

In the formulas (5) and (6), $R^4$ is an alkyl group having 4 to 30 carbon atoms, an aralkyl group having 7 to 30 carbon atoms, a perfluoroalkyl group having 4 to 30 carbon atoms, or a group represented by the following formula (7).

(7)

The number of carbon atoms in the alkyl group as $R^4$ is preferably 4 to 22, more preferably 8 to 22. Illustrative examples of the alkyl group include hexyl, octyl, nonyl, decyl, undecyl, dodecyl, pentadecyl, hexadecyl and octadecyl groups.

The number of carbon atoms in the aralkyl group as $R^4$ is preferably 8 to 20, more preferably 10 to 20. Illustrative examples of the aralkyl group include benzyl, phenethyl, methylbenzyl, 2-phenylpropane-2-yl and diphenylmethyl groups.

The number of carbon atoms in the perfluoroalkyl group as $R^4$ is preferably 4 to 20. Illustrative examples of the perfluoroalkyl group include 4,4,5,5,6,6,7,7,7-nonafluoroheptyl, 4,4,5,5,6,6,7,7,8,8,9,9,9-tridecafluorononyl and 4,4,5,5,6,6,7,7,8,8,9,9,10,10,11,11,11-heptadecafluoroundecyl groups.

In the formula (7), $R^5$, $R^6$, $R^7$, $R^8$ and $R^9$ each independently represent at least one group selected from the group consisting of an alkyl group having 1 to 10 carbon atoms, a cycloalkyl group having 6 to 20 carbon atoms, an alkenyl group having 2 to 10 carbon atoms, an aryl group having 6 to 10 carbon atoms and an aralkyl group having 7 to 20 carbon atoms.

Specific examples of the alkyl group having 1 to 10 carbon atoms in the formula (7) include methyl, ethyl, propyl, butyl and heptyl groups. Specific examples of the cycloalkyl group having 6 to 20 carbon atoms include cyclohexyl, cyclooctyl, cyclohexyl and cyclodecyl groups. Specific examples of the alkenyl group having 2 to 10 carbon atoms include ethenyl, propenyl, butenyl and heptenyl groups. Specific examples of the aryl group having 6 to 10 carbon atoms include phenyl, tolyl, dimethylphenyl and naphthyl groups. Specific examples of the aralkyl group having 7 to 20 carbon atoms include benzyl, phenethyl, methylbenzyl, 2-phenylpropane-2-yl and diphenylmethyl groups.

It is preferred that $R^5$, $R^6$, $R^7$, $R^8$ and $R^9$ in the formula (7) each independently represent at least one group selected from the group consisting of an alkyl group having 1 to 10 carbon atoms and an aryl group having 6 to 10 carbon atoms. It is particularly preferred that they each independently represent at least one group selected from the group consisting of a methyl group and a phenyl group.

b is preferably an integer of 0 to 3, more preferably an integer of 1 to 3, much more preferably an integer of 2 or 3. c is preferably an integer of 4 to 100, more preferably an integer of 4 to 50, much more preferably an integer of 8 to 50.

Y in the formula (6) represents at least one bond selected from the group consisting of a single bond, an ether bond, a thioether bond, an ester bond, an amino bond and an amide bond. Y is preferably at least one bond selected from the group consisting of a single bond, an ether bond and an ester bond. Of these, the single bond and the ester bond are preferred.

a is preferably an integer of 1 to 5, more preferably an integer of 1 to 3, much more preferably 1.

The terminal group represented by the above formula (5) or (6) is preferably derived from a biogenic matter. Illustrative examples of the biogenic matter include long-chain alkyl alcohols having 14 or more carbon atoms such as cetanol, stearyl alcohol and behenyl alcohol.

The content of the terminal group represented by the formula (5) or (6) is preferably 0.3 to 9 wt %, more preferably 0.3 to 7.5 wt %, much more preferably 0.5 to 6 wt %, based on the polymer main chain.

By containing the terminal group represented by the formula (5) or (6) at the terminal of the polycarbonate resin (component A), the moldability (mold releasability) and moisture resistance of the resin composition are improved.

(Melt Viscosity)

The polycarbonate resin (component A) preferably shows a melt viscosity measured at 250° C. by a capillary rheometer of $0.08 \times 10^3$ to $2.4 \times 10^3$ Pa·s, more preferably $0.1 \times 10^3$ to $2.0 \times 10^3$ Pa·s, much more preferably $0.1 \times 10^3$ to $1.5 \times 10^3$ Pa·s, at a shear rate of 600 $sec^{-1}$. With the melt viscosity within this range, mechanical strength is excellent, and silver streak does not occur advantageously when molding is performed by use of the resin composition of the present invention.

(Specific Viscosity)

Further, the lower limit of the specific viscosity at 20° C. of a solution prepared by dissolving 0.7 g of the polycarbonate resin (component A) in 100 ml of methylene chloride is preferably 0.14, more preferably 0.20, particularly preferably 0.22. Its upper limit is preferably 0.45, more preferably 0.37, much more preferably 0.34. When the specific viscosity is lower than 0.14, it is difficult for a molded article obtained from the resin composition of the present invention to have sufficient mechanical strength. Meanwhile, when the specific viscosity is higher than 0.45, melt flowability becomes too high, so that melt temperature having flowability required for molding becomes higher than decomposition temperature.

(Glass Transition Temperature: Tg)

The lower limit of the glass transition temperature (Tg) of the polycarbonate resin (component A) is preferably 145° C., more preferably 148° C. Further, its upper limit is preferably 165° C. Thus, the glass transition temperature (Tg) of the component A is preferably 145 to 165° C. When the Tg is lower than 145° C., heat resistance (particularly, heat resistance by moisture absorption) is poor, while when the Tg is higher than 165° C., melt flowability when molding is performed by use of the resin composition of the present invention is poor. The Tg is measured by DSC (type: DSC2910) of TA Instruments Co., Ltd.

(5% Weight Reduction Temperature: Td)

The lower limit of the 5% weight reduction temperature (Td) of the polycarbonate resin (component A) is preferably 320° C., more preferably 330° C. Further, its upper limit is preferably 400° C., more preferably 390° C., much more preferably 380° C. Thus, the 5% weight reduction temperature (Td) of the component A is preferably 320 to 400° C. With the 5% weight reduction temperature within the above range, decomposition of the resin when molding is performed by use of the resin composition of the present invention hardly occurs advantageously. The 5% weight reduction temperature is measured by TGA (type: TGA2950) of TA Instruments Co., Ltd.

(Production of Polycarbonate Resin (Component A))

The polycarbonate resin (component A) can be produced by melt-polymerizing a diol component that mainly comprises an ether diol represented by the following formula (a):

(a)

and carbonate diester. Specific examples of the ether diol include isosorbide, isomannide and isoidide represented by the following formulas (b), (c) and (d).

(b)

(c)

(d)

These sugar-derived ether diols are materials that are also obtained from biomass in nature and are one of recyclable resources. The isosorbide is obtained by hydrogenating D-glucose obtained from starch and then dehydrating it. The other ether diols are also obtained by the same reaction except for starting materials.

Particularly, isosorbide(1,4:3,6-dianhydro-D-sorbitol) is preferred as the ether diol. The isosorbide is an ether diol that can be easily produced from starch. It is available in abundance as a resource and is excellent in all of ease of production, characteristics and versatility as compared with isomannide and isoidide.

The content of the ether diol of the formula (a) is preferably not less than 70 mol %, more preferably not less than 80 mol %, much more preferably not less than 90 mol %, further preferably not less than 95 mol %, particularly preferably not less than 98 mol %, based on all diol components. The diol most preferably comprises only the ether diol of the formula (a).

The polycarbonate resin (component A) may be copolymerized with an aliphatic diol or aromatic bisphenol as long as its properties are not impaired. Specific examples of the aliphatic diol include straight-chain alkane diols such as ethylene glycol, 1,3-propanediol, 1,4-butanediol, 1,5-pentanediol and 1,6-hexanediol, and cycloalkane diols such as cyclohexane diol and cyclohexane dimethanol. Of these, 1,3-propanediol, 1,4-butanediol, hexanediol and cyclohexane dimethanol are preferred.

Specific examples of the aromatic bisphenol include 2,2-bis(4-hydroxyphenyl)propane (commonly known as "bisphenol A"), 1,1-bis(4-hydroxyphenyl)cyclohexane, 1,1-bis(4-hydroxyphenyl)-3,3,5-trimethylcyclohexane, 4,4'-(m-phenylenediisopropylidene)diphenol, 9,9-bis(4-hydroxy-3-methylphenyl)fluorene, 2,2-bis(4-hydroxy-3-methylphenyl)propane, 2,2-bis(4-hydroxyphenyl)-4-methylpentane, 1,1-bis(4-hydroxyphenyl)decane, and 1,3-bis{2-(4-hydroxyphenyl)propyl}benzene. Specific examples thereof further include aromatic diols such as dimethanol benzene and diethanol benzene.

The content of the aliphatic diol or aromatic bisphenol is preferably not higher than 30 mol %, more preferably not higher than 20 mol %, much more preferably not higher than 10 mol %, further preferably not higher than 5 mol %, particularly preferably not higher than 2 mol %, based on all diol components.

A terminal-modified polycarbonate resin (component A) can be produced by reacting a hydroxy compound represented by the following formula (8) or (9).

(8)

(9)

The amount of the hydroxy compound is preferably 0.3 to 7.5 wt %, more preferably 0.5 to 6 wt %, based on all diol components.

In the hydroxy compound represented by the formula (8) or (9), $R^4$, Y, a, $R^5$, $R^6$, $R^7$, $R^8$, $R^9$, b and c are the same as those in the formulas (5) and (6). The hydroxy compounds may be used alone or in admixture of two or more. When two or more of the hydroxy compounds are used, the hydroxy compound represented by the formula (8) or (9) may be used in combination with a hydroxy compound other than the hydroxy compound represented by the formula (8) or (9). The hydroxy compound improves the heat resistance, thermal stability, moldability and moisture resistance of the polycarbonate resin.

The reaction temperature is preferably as low as possible to inhibit decomposition of the ether diol and to obtain a resin that is mildly colored and has high viscosity. To cause the polymerization reaction to proceed properly, the polymerization temperature is preferably 180 to 280° C., more preferably 180 to 270° C.

Further, a method is preferred which comprises heating the ether diol and the carbonate dieter at normal pressure to subject them to a preliminary reaction and then reducing the pressure gradually in the initial stage of the reaction and reducing the pressure in the system to about $1.3 \times 10^{-3}$ to $1.3 \times 10^{-5}$ MPa to facilitate removal of produced alcohol or phenol by distillation. The reaction time is generally about 1 to 4 hours.

The polycarbonate resin (component A) used in the present invention can be produced by melt-polymerizing in the presence of (i) a nitrogen-containing basic compound and (ii) an alkali (earth) metal compound. The alkali (earth) metal compound (ii) is (ii-1) an alkali metal compound, (ii-2) an alkali earth metal compound, or a mixture of these compounds.

Specific examples of the nitrogen-containing basic compound (i) include tetramethylammonium hydroxide, tetraethylammonium hydroxide, tetrabutylammonium hydroxide, trimethylamine, and triethylamine.

Specific examples of the alkali metal compound (ii-1) include sodium hydroxide, potassium hydroxide, sodium carbonate, potassium carbonate, sodium hydrogen carbonate, and a sodium salt or potassium salt of dihydric phenol. Specific examples of the alkali earth metal compound (ii-2) include calcium hydroxide, barium hydroxide and magnesium hydroxide. Above all, it is preferred to use the nitrogen-containing basic compound (i) and the alkali metal compound (ii-1) in combination.

These polymerization catalysts are used in an amount of preferably $1 \times 10^{-9}$ to $1 \times 10^{-3}$ equivalent, more preferably $1 \times 10^{-8}$ to $5 \times 10^{-4}$ equivalent, per mol of the carbonate diester component. The reaction system is preferably kept in a gas atmosphere inert to a raw material such as nitrogen, a reaction mixture and a reaction product. An example of inert gas other than nitrogen is argon. Further, additives such as an antioxidant may be added as required.

When a catalyst comprising the nitrogen-containing basic compound (i) and the alkali (earth) metal compound (ii) is used, a polycarbonate resin having higher 5% weight reduction temperature (Td) than when tin or the like is used as a catalyst can be produced.

Illustrative examples of the carbonate diester include esters of an aryl group that may be substituted and has 6 to 20 carbon atoms, an aralkyl group and an alkyl group having 1 to 18 carbon atoms. Specific examples thereof include diphenyl carbonate, bis(chlorophenyl)carbonate, m-cresyl carbonate, dinaphthyl carbonate, bis(p-butylphenyl)carbonate, dimethyl carbonate, diethyl carbonate, and dibutyl carbonate. Of these, diphenyl carbonate is preferred.

The carbonate diester is preferably mixed in a molar ratio of 1.02 to 0.98, more preferably 1.01 to 0.98, much more preferably 1.01 to 0.99, based on all diol components. When the molar ratio of the carbonate diester is higher than 1.02, carbonate diester residues block terminals, so that a sufficient degree of polymerization cannot be achieved disadvantageously. Meanwhile, even when the molar ratio of the carbonate diester is lower than 0.98, a sufficient degree of polymerization cannot be achieved disadvantageously.

It is also possible to add a catalyst deactivator to the polycarbonate resin (component A) obtained by the above production method. As the catalyst deactivator, known catalyst deactivators are used effectively. Of these, ammonium sulfonate and phosphonium sulfonate are preferred. Further, the above salts of dodecylbenzenesulfonic acid such as tetrabutylphosphonium dodecylbenzenesulfonate and the above salts of paratoluenesulfonic acid such as tetrabutylammonium paratoluenesulfonate are preferred. Further, as sulfonic acid esters, methyl benzenesulfonate, ethyl benzenesulfonate, butyl benzenesulfonate, octyl benzenesulfonate, phenyl benzenesulfonate, methyl paratoluenesulfonate, ethyl paratoluenesulfonate, butyl paratoluenesulfonate, octyl paratoluenesulfonate, and phenyl paratoluenesulfonate are preferably used. Of these, tetrabutylphosphonium dodecylbenzenesulfonate is most preferably used. These catalyst deactivators are used in an amount of preferably 0.5 to 50 mol, more preferably 0.5 to 10 mol, much more preferably 0.8 to 5 mol, per mol of polymerization catalyst selected from the alkali metal compound and/or the alkali earth metal compound.

(Phosphorus Compound: Component B)

The thermal decomposition temperature (5% weight reduction temperature) of the phosphorus compound (component B) used in the present invention is not higher than 340° C. The thermal decomposition temperature of the component B is preferably not higher than 330° C., more preferably not higher than 325° C. The thermal decomposition temperature (5% weight reduction temperature) is measured by TGA (type: TGA2950) of TA Instruments Co., Ltd.

The content of the phosphorus compound (component B) in the resin composition of the present invention is 1 to 60 parts by weight, preferably 3 to 55 parts by weight, more preferably 3 to 50 parts by weight, based on 100 parts by weight of the polycarbonate resin (component A).

(Phosphorus Compound: B-1)

The phosphorus compound (component B) is preferably an organophosphorus compound (B-1) represented by the following formula (2):

(2)

wherein $R^1$, $X^1$ and $X^2$ each independently represent a hydrogen atom, an alkyl group having 1 to 10 carbon atoms, an alkoxy group having 1 to 10 carbon atoms, an aryl group having 6 to 15 carbon atoms, an aryloxy group having 6 to 15 carbon atoms, an aralkyl group having 7 to 20 carbon atoms or an aralkyloxy group having 7 to 20 carbon atoms, and $X^1$ and $X^2$ may bond to each other and form a ring with adjacent phosphorus atoms.

Specific examples of the alkyl group having 1 to 10 carbon atoms include methyl, ethyl, propyl, butyl and heptyl groups. Specific examples of the alkoxy group having 1 to 10 carbon atoms include methoxy, ethoxy, propoxy, butoxy and heptoxy groups. Specific examples of the aryl group having 6 to 15 carbon atoms include phenyl, tolyl, dimethylphenyl and naphthyl groups. Specific examples of the aryloxy group having 6 to 15 carbon atoms include phenyloxy, tolyloxy, dimethylphenyloxy and naphthyloxy groups. Specific examples of the aralkyl group having 7 to 20 carbon atoms include benzyl, phenethyl, methylbenzyl, 2-phenylpropane-2-yl and diphenylmethyl groups. Specific examples of the aralkyloxy group having 7 to 20 carbon atoms include benzyloxy, phenethyloxy, methylbenzyloxy, 2-phenylpropane-2-yl-oxy and diphenylmethyloxy groups.

$R^1$ is preferably a hydrogen atom, an aryl group having 6 to 15 carbon atoms or an aralkyl group having 7 to 20 carbon atoms. The number of carbon atoms in the aryl group is preferably 8 to 15, more preferably 10 to 15. The number of carbon atoms in the aralkyl group is preferably 8 to 20, more preferably 10 to 20.

$X^1$ is preferably an alkyl group having 1 to 10 carbon atoms, an aryl group having 6 to 15 carbon atoms or an aralkyl group having 7 to 20 carbon atoms.

$X^2$ is preferably an alkoxy group having 1 to 10 carbon atoms, an aryloxy group having 6 to 15 carbon atoms or an aralkyloxy group having 7 to 20 carbon atoms. $X^1$ and $X^2$ may bond to each other and form a ring with adjacent phosphorus atoms. The organophosphorus compound (B-1) is preferably a phosphinate compound.

More specifically, the organophosphorus compound (B-1) is preferably a phosphinate compound represented by the following formula (3).

(3)

In the formula (3), $R^1$ is preferably a hydrogen atom, an aryl group having 6 to 15 carbon atoms or an aralkyl group having 7 to 20 carbon atoms. The number of carbon atoms in the aryl group is preferably 8 to 15, more preferably 10 to 15. Specific examples of the aryl group include phenyl, tolyl, dimethylphenyl and naphthyl groups. The number of carbon atoms in the aralkyl group is preferably 8 to 20, more preferably 10 to 20. Specific examples of the aralkyl group include benzyl, phenethyl, methylbenzyl, 2-phenylpropane-2-yl and diphenylmethyl groups. $R^1$ is more preferably an aralkyl group having 7 to 20 carbon atoms.

In the formula (3), $R^2$ and $R^3$ are each independently a hydrogen atom, a halogen atom, an alkyl group having 1 to 10 carbon atoms, an alkoxy group having 1 to 10 carbon atoms, an aryl group having 6 to 15 carbon atoms, an aryloxy group having 6 to 15 carbon atoms, an aralkyl group having 7 to 20 carbon atoms or an aralkyloxy group having 7 to 20 carbon atoms.

Specific examples of the halogen atom include fluorine, chlorine and bromine atoms.

Specific examples of the alkyl group having 1 to 10 carbon atoms include methyl, ethyl, propyl, butyl and heptyl groups. Specific examples of the alkoxy group having 1 to 10 carbon atoms include methoxy, ethoxy, propoxy, butoxy and heptoxy groups. Specific examples of the aryl group having 6 to 15 carbon atoms include phenyl, tolyl, dimethylphenyl and naphthyl groups. Specific examples of the aryloxy group having 6 to 15 carbon atoms include phenyloxy, tolyloxy, dimethylphenyloxy and naphthyloxy groups. Specific examples of the aralkyl group having 7 to 20 carbon atoms include benzyl, phenethyl, methylbenzyl, 2-phenylpropane-2-yl and diphenylmethyl groups. Specific examples of the aralkyloxy group having 7 to 20 carbon atoms include benzyloxy, phenethyloxy, methylbenzyloxy, 2-phenylpropane-2-yl-oxy and diphenylmethyloxy groups.

$R^2$ and $R^3$ are more preferably each independently a hydrogen atom, an alkyl group having 1 to 10 carbon atoms, an aryl group having 6 to 15 carbon atoms or an aralkyl group having 7 to 20 carbon atoms. Further, $R^2$ and $R^3$ are particularly preferably each independently a hydrogen atom or an alkyl group having 1 to 10 carbon atoms.

The content of the organophosphorus compound (B-1) represented by the formula (2) in the resin composition of the present invention is preferably 1 to 30 parts by weight, more preferably 3 to 15 parts by weight, much more preferably 3 to 10 parts by weight, based on 100 parts by weight of the polycarbonate resin (component A).

(Phosphate Compound Having Nitrogen Atom: B-2)

Further, the phosphorus compound (component B) is preferably a phosphate compound (B-2) having a nitrogen atom. The phosphate compound (B-2) having a nitrogen atom is preferably ammonium polyphosphate or a compound composed essentially of ammonium polyphosphate.

The ammonium polyphosphate is a compound represented by the following formula:

$(NH_4)_{r+2}P_rO_{3r+1}$ (wherein r is an integer of 20 to 1,000)

That is, it is a compound represented by $NH_4^+O^-$—$(NH_4PO_3)_r$—$NH_4^+$. The structure of the ammonium polyphosphate is represented by the following formula.

The ammonium polyphosphate is a compound that can come close to the formula $(NH_4PO_3)_r$ (wherein r is the same as defined above) of metaphosphoric acid when r is sufficiently large.

As the ammonium polyphosphate, commercial products can be used. Illustrative examples of the commercial products include Exolit-422 (product of Hoechst AG), Exolit-700 (product of Hoechst AG), Phos-chek-P/30 (product of Monsanto Company), Phos-chek-P/40 (product of Monsanto Company), Sumisafe-P (product of Sumitomo Chemical Co., Ltd.), TERRAJU-S10 (product of Chisso Corporation), and TERRAJU-S20 (product of Chisso Corporation).

Meanwhile, illustrative examples of the compound composed essentially of ammonium polyphosphate include ammonium polyphosphate coated or microencapsulated with a thermosetting resin, ammonium polyphosphate coated with a melamine monomer, other nitrogen-containing organic compound or the like, ammonium polyphosphate treated with a surfactant or a silicone compound, and ammonium polyphosphate which has been made poorly soluble by addition of melamine or the like in the process of producing the ammonium polyphosphate.

An example of a method for obtaining ammonium polyphosphate coated or microencapsulated with a thermosetting resin is an interfacial polymerization method comprising supporting or attaching, on the surface of the ammonium polyphosphate, one or more of monomers or oligomers of thermosetting resin components such as a melamine resin, modified melamine resin, guanamine resin, epoxy resin, phenol resin, urethane resin, urea resin and polycarbodiimide and polymerizing (or polycondensing) the monomer or oligomer. Another example of the method is a method of obtaining coated or microencapsulated ammonium polyphosphate by an in-situ polymerization method. Another example of the method is an in-liquid curing method comprising coating the surface of ammonium polyphosphate with a coating resin that is in a uncured but completed polymer state and then curing the resin in a solvent. Another example of the method is a phase separation method using the concentration gradient of a polymer solution prepared by dissolving a coating polymer in a solvent. Another example of the method is a spray drying method comprising spraying an encapsulation stock solution, bringing the sprayed solution into contact with hot air and evaporating volatile matters to dry the solution. Another example of the method is an in-liquid drying method comprising dissolving a coating polymer in a solvent under heating, dispersing ammonium polyphosphate in the solution and volatilizing the solvent under agitation or emulsifying and dispersing the coating polymer in a non-solvent and quenching the mixture to extract the coating polymer.

Illustrative examples of commercial products of the compound composed essentially of ammonium polyphosphate include Exolit-462 (product of Hoechst AG), Exolit-750 (product of Hoechst AG), Sumisafe-PM (product of Sumitomo Chemical Co., Ltd.), TERRAJU-C60 (product of Chisso Corporation), TERRAJU-C70 (product of Chisso Corporation), TERRAJU-C80 (product of Chisso Corporation), ADKSTAB FP2100 (product of ADEKA CORPORATION), ADKSTAB FP2200 (product of ADEKA CORPORATION) and FIRE CUT P-770 (product of SUZUHIRO CHEMICAL CO., LTD.).

The content of the phosphate compound (B-2) having a nitrogen atom in the resin composition of the present invention is preferably 10 to 60 parts by weight, more preferably 10 to 50 parts by weight, much more preferably 15 to 50 parts by weight, based on 100 parts by weight of the polycarbonate resin. When the content of the phosphate compound (B-2) having a nitrogen atom is lower than 10 parts by weight, development of flame retardancy is liable to be insufficient, while when the content is higher than 60 parts by weight, the mechanical properties of the resin composition deteriorate.

(Drip Inhibitor: Component C)

Illustrative examples of the drip inhibitor (component C) used in the present invention include polytetrafluoroethylene (hereinafter may be referred to as "PTFE"), a silicone resin such as polyorganosiloxane, and a resin which can be melt-kneaded with polyolefin or polyamide as a base resin and has a high weight average molecular weight (of at least 1,000, 000). A preferred drip inhibitor is PTFE (including a powder mixture containing the PTFE). Illustrative examples of commercial products of the PTFE include Teflon (registered trademark) 6J of DU PONT-MITSUI FLUOROCHEMICALS COMPANY, LTD. and POLYFLON MPA FA500, F-201L of DAIKIN INDUSTRIES, Ltd.

The content of the drip inhibitor (component C) in the resin composition of the present invention is preferably 0.01 to 5 parts by weight, more preferably 0.01 to 1 part by weight, much more preferably 0.1 to 1 part by weight, based on 100 parts by weight of the polycarbonate resin (component A). When the content of the drip inhibitor (component C) is lower than 0.01 part by weight, development of drip inhibition is liable to be insufficient, while when the content is higher than 5 parts by weight, a colored component is liable to be produced at the time of extrusion or molding.

(Mold Releasing Agent)

The resin composition of the present invention can contain a mold releasing agent as required. The mold releasing agent is preferably an ester of alcohol and fatty acid. Inter alia, an ester of monohydric alcohol and fatty acid or a partial ester or full ester of polyhydric alcohol and fatty acid is preferred. The partial ester and/or full ester of polyhydric alcohol and fatty acid are/is more preferred. The partial ester of polyhydric alcohol and fatty acid is much more preferred. The partial ester refers to one in which some of hydroxyl groups of polyhydric alcohol do not undergo an ester reaction with fatty acid and remain. Further, at least one mold releasing agent selected from the group consisting of an ester of monohydric alcohol having 1 to 20 carbon atoms and saturated fatty acid having 10 to 30 carbon atoms and a partial ester or full ester of polyhydric alcohol having 1 to 25 carbon atoms and saturated fatty acid having 10 to 30 carbon atoms is preferred. Particularly, the partial ester or full ester of polyhydric alcohol having 1 to 25 carbon atoms and saturated fatty acid having 10 to 30 carbon atoms is used.

Specific examples of the ester of monohydric alcohol and saturated fatty acid include stearyl stearate, palmityl palmitate, butyl stearate, methyl laurate, and isopropyl palmitate.

Specific examples of the partial ester or full ester of polyhydric alcohol and saturated fatty acid include glycerin monostearate, glycerin distearate, glycerin tristearate, glycerin monobehenate, pentaerythritol monostearate, pentaerythritol distearate, pentaerythritol tetrastearate, pentaerythritol tetrapelargonate, propylene glycol monostearate, biphenyl biphenate, sorbitan monostearate, 2-ethylhexyl stearate, and a full ester or partial ester of dipentaerythritol such as dipentaerythritol hexastearate.

Of these esters, partial esters such as glycerin monostearate, glycerin distearate, glycerin monobehenate, pentaerythritol monostearate, pentaerythritol distearate, propylene glycol monostearate and sorbitan monostearate are preferred, glycerin monostearate, sorbitan monostearate, pentaerythritol monostearate and pentaerythritol distearate are more preferred, and glycerin monostearate is particularly preferred. The compound of the component C may be one or a mixture of two or more.

The content of the mold releasing agent is preferably 0.01 to 0.5 part by weight, more preferably 0.03 to 0.5 part by weight, much more preferably 0.03 to 0.3 part by weight, particularly preferably 0.03 to 0.2 part by weight, based on 100 parts by weight of the polycarbonate resin (component A). With the content of the mold releasing agent within the above range, an improvement in mold releasability can be achieved while yellowing is suppressed.

(Thermal Stabilizer)

The resin composition of the present invention may further contain a hindered phenol thermal stabilizer and/or a phosphorus thermal stabilizer.

Illustrative examples of the hindered phenol thermal stabilizer include, for example, octadecyl-3-(3,5-di-tert-butyl-4-hydroxyphenyl) propionate, benzenepropane acid 3,5-bis(1,1-dimethylethyl)-4-hydroxyalkyl ester (alkyl has 7 to 9 carbon atoms and has a side chain), ethylenebis(oxyethylene) bis[3-(5-tert-butyl-4-hydroxy-m-tolyl) propionate], hexamethylenebis[3-(3,5-di-tert-butyl-4-hydroxyphenyl) propionate], pentaerythritol tetrakis[3-(3,5-di-tert-butyl-4-hydroxyphenyl) propionate], 3,9-bis[2-[3-(3-tert-butyl-4-hydroxy-5-methylphenyl)propionyloxy]-1,1-dimethylethyl]-2,4,8,10-tetraoxaspiro[5,5]undecane, 2,2'-methylenebis(6-tert-butyl-4-methylphenol, 2,2'-isopropylidenebis(6-tert-butyl-4-methylphenol, 2-tert-butyl-6-(3-tert-butyl-2-hydroxy-5-methylbenzyl)-4-methylphenyl acrylate, 2-tert-pentyl-6-(3-tert-pentyl-2-hydroxy-5-methylbenzyl)-4-methylphenyl acrylate, 2-tert-butyl-6-(3-tert-butyl-2-hydroxy-5-methylbenzyl)-4-methylphenyl methacrylate, 2-tert-pentyl-6-(3-tert-pentyl-2-hydroxy-5-methylbenzyl)-4-methylphenyl acrylate, 2-[1-(2-hydroxy-3,5-di-tert-butylphenyl)ethyl]-4,6-di-tert-butylphenyl acrylate, 2-[1-(2-hydroxy-3,5-di-tert-pentylphenyl)ethyl]-4,6-di-tert-pentylphenyl acrylate, 2-[1-(2-hydroxy-3,5-di-tert-butylphenyl)ethyl]-4,6-di-tert-butylphenyl methacrylate, and 2-[1-(2-hydroxy-3,5-di-tert-pentylphenyl)ethyl]-4,6-di-tert-pentylphenyl methacrylate. The above hindered phenol stabilizers can be used alone or in admixture of two or more.

The content of the hindered phenol stabilizer is preferably 0.0005 to 0.1 part by weight, more preferably 0.001 to 0.1 part by weight, much more preferably 0.005 to 0.1 part by weight, particularly preferably 0.01 to 0.1 part by weight, based on 100 parts by weight of the polycarbonate resin (component A). With the content of the hindered phenol thermal stabilizer within the above range, a reduction in molecular weight and color deterioration in molding the resin composition of the present invention can be inhibited.

Illustrative examples of the phosphorus thermal stabilizer include phosphorous acid, phosphoric acid, phosphorous acid, phosphoric acid and their esters. Specific examples of the phosphite compound include, for example, triphenyl phosphite, tris(nonylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, 2,2-methylenebis(4,6-di-tert-butylphenyl)octyl phosphite, tris(diethylphenyl)phosphite, tris(di-iso-propylphenyl) phosphite, tris(di-n-butylphenyl)phosphite, tris(2,4-di-tert-butylphenyl)phosphite, tris(2,6-di-tert-butylphenyl) phosphite, distearyl pentaerythritol diphosphite, bis(2,4-di-tert-butylphenyl)pentaerythritol diphosphite, bis(2,6-di-tert-butyl-4-methylphenyl)pentaerythritol diphosphite, bis(2,6-di-tert-butyl-4-ethylphenyl)pentaerythritol diphosphite, phenyl bisphenol A pentaerythritol diphosphite, bis(nonylphenyl)pentaerythritol diphosphite, and dicyclohexyl pentaerythritol diphosphite.

In addition, a phosphite compound that reacts with a dihydric phenol and has a cyclic structure can also be used. Specific examples of such a phosphite compound include 2,2'-methylenebis(4,6-di-tert-butylphenyl) (2,4-di-tert-butylphenyl)phosphite, 2,2'-methylenebis(4,6-di-tert-butylphenyl)(2-tert-butyl-4-methylphenyl)phosphite, 2,2'-methylenebis(4-methyl-6-tert-butylphenyl) (2-tert-butyl-4-methylphenyl)phosphite, and 2,2'-ethylidenebis(4-methyl-6-tert-butylphenyl) (2-tert-butyl-4-methylphenyl)phosphite.

Specific examples of the phosphate compound include tributyl phosphate, trimethyl phosphate, tricresyl phosphate, triphenyl phosphate, trichlorphenyl phosphate, triethyl phosphate, diphenylcresyl phosphate, diphenyl monoorthoxenyl phosphate, tributoxyethyl phosphate, dibutyl phosphate, dioctyl phosphate, and diisopropyl phosphate. Triphenyl phosphate and trimethyl phosphate are preferred.

Specific examples of the phosphonite compound include tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, tetrakis(2,6-di-tert-butylphenyl)-4,4'-biphenylene diphosphonite, tetrakis(2,6-di-tert-butylphenyl)-4,3'-biphenylene diphosphonite, tetrakis(2,6-di-tert-butylphenyl)-3,3'-biphenylene diphosphonite, bis(2,4-di-tert-butylphenyl)-4-phenyl-phenyl phosphonite, bis(2,4-di-tert-butylphenyl)-3-phenyl-phenyl phosphonite, bis(2,6-di-n-butylphenyl)-3-phenyl-phenyl phosphonite, bis(2,6-di-tert-butylphenyl)-4-phenyl-phenyl phosphonite, and bis(2,6-di-tert-butylphenyl)-3-phenyl-phenyl phosphonite. Tetrakis(di-tert-butylphenyl)-biphenylene diphosphonite and bis(di-tert-butylphenyl)-phenyl-phenyl phosphonite are preferred, and tetrakis(2,4-di-tert-butylphenyl)-biphenylene diphosphonite and bis(2,4-di-tert-butylphenyl)-phenyl-phenyl phosphonite are more preferred. The phosphonite compound can be preferably used in combination with a phosphite compound having an aryl group substituted with two or more alkyl groups.

Specific examples of the phosphonate compound include dimethyl benzenephosphonate, diethyl benzenephosphonate, and dipropyl benzenephosphonate. The above phosphorus stabilizers can be used alone or in admixture of two or more.

The content of the phosphorus stabilizer is preferably 0.001 to 0.5 part by weight, more preferably 0.005 to 0.5 part by weight, much more preferably 0.005 to 0.3 part by weight, particularly preferably 0.01 to 0.3 part by weight, based on 100 parts by weight of the polycarbonate resin (component A). With the content of the phosphorus stabilizer within the above range, a reduction in molecular weight and color deterioration in molding the resin composition of the present invention can be inhibited.

(Rubbery Polymer)

The resin composition of the present invention may contain a rubbery polymer for the purpose of improving impact resistance. The rubbery polymer refers to a polymer comprising a rubber component having a glass transition temperature of not higher than 10° C., preferably not higher than −10° C., more preferably not higher than −30° C. and a copolymer comprising the polymer comprising the rubber component and other polymer chains bonded to the polymer. Further, the rubbery polymer also refers to a polymer comprising the rubber component in an amount of at least 35 wt %, more preferably 45 wt %, based on 100 wt % of the rubbery polymer. The upper limit of the content of the rubber component is suitably about 90 wt % from a practical standpoint.

Illustrative examples of the rubbery polymer include an SB (styrene-butadiene) copolymer, ABS (acrylonitrile-butadiene-styrene) copolymer, MBS (methyl methacrylate-butadiene-styrene) copolymer, MABS (methyl methacrylate-acrylonitrile-butadiene-styrene) copolymer, MB (methyl methacrylate-butadiene) copolymer, ASA (acrylonitrile-styrene-acrylic rubber) copolymer, AES (acrylonitrile-ethylene propylene rubber-styrene) copolymer, MA (methyl methacrylate-acrylic rubber) copolymer, MAS (methyl methacrylate-acrylic rubber-styrene) copolymer, methyl methacrylate-.acryl-butadiene rubber copolymer, methyl methacrylate-acryl.butadiene rubber-styrene copolymer, methyl methacrylate-(acryl.silicone IPN rubber) copolymer, and natural rubber. Of these, at least one rubbery polymer selected from the group consisting of an SB copolymer, ABS copolymer, MBS copolymer, methyl methacrylate.acryl-butadiene rubber copolymer, methyl methacrylate-(acryl.silicone IPN rubber) copolymer and natural rubber is preferred.

The content of the rubbery polymer in the resin composition of the present invention is preferably 1 to 30 parts by weight, more preferably 1 to 15 parts by weight, much more preferably 1 to 10 parts by weight, particularly preferably 1 to 7 parts by weight, based on 100 parts by weight of the polycarbonate resin (component A). When the content of the rubbery polymer is lower than 1 part by weight, development of impact strength is liable to be insufficient, while when the content is higher than 30 parts by weight, heat resistance or rigidity deteriorates, and flame retardancy does not develop.

(Melt Viscosity)

The melt viscosity measured at 250° C. by a capillary rheometer of the resin composition of the present invention is preferably $0.08 \times 10^3$ to $2.4 \times 10^3$ Pa·s, more preferably $0.1 \times 10^3$ to $2.0 \times 10^3$ Pa·s, much more preferably $0.1 \times 10^3$ to $1.5 \times 10^3$ Pa·s, at a shear rate of 600 $\sec^{-1}$. With the melt viscosity within the above range, a good molded article which has excellent mechanical strength and does not undergo the occurrence of silver streak at the time of melt molding is obtained.

(Flexural Modulus)

The flexural modulus measured in accordance with ISO178 of the resin composition of the present invention is preferably 2,500 to 6,000 MPa, more preferably 2,750 to 5,000 MPa, much more preferably 3,000 to 5,000 MPa. With the flexural modulus within the above range, a molded article having excellent rigidity (flexural modulus) can be obtained.

(Deflection Temperature Under Load)

The deflection temperature under a load of 0.45 MPa measured in accordance with ISO75 of the resin composition of the present invention is preferably 80 to 160° C., more preferably 90 to 150° C., much more preferably 100 to 150° C., particularly preferably 110 to 150° C. When the deflection temperature under load is within the above range, balance between heat resistance and melt flowability is good advantageously.

(UL-94)

Further, the Resin Composition of the Present invention has a flame retardancy level evaluated in accordance with a vertical flame test provided in the U.S. UL standard UL-94 in a 1.6-mm (1/16-inch) test piece of at least V-2.

(Production of Resin Composition)

The resin composition of the present invention can be produced by melt-kneading the foregoing components by use of an extruder.

As the extruder, a twin-screw extruder is particularly suitable. A twin-screw extruder having a vent through which water in the raw materials and volatile gas produced from the melt-kneaded resin can be discharged can be preferably used. A vacuum pump for discharging produced water or volatile gas out of the extruder efficiently from the vent is preferably disposed.

Further, a screen for removing foreign materials mixed in the raw materials to be extruded can be placed in a zone in front of the die of the extruder to remove foreign materials from the resin composition. Illustrative examples of the screen include woven metal wire, a screen changer, and a sintered metal plate (such as a disk filter).

Further, a method of feeding the component B and other additives (simply referred to as "additives" in the following exemplary methods) to an extruder is not particularly limited and is exemplified by the following typical methods, i.e.

(i) a method comprising feeding additives into an extruder separately from the resin of the component A, (ii) a method comprising premixing additives with the resin powder of the component A by use of a blender such as a super mixer and then feeding the premix into an extruder, (iii) a method comprising melt-kneading additives with the resin of the component A and then forming the mixture into master pellets, and (iv) a method comprising preparing a solution having the resin and additives dispersed uniformly in a solvent and then removing the solvent as another premixing method.

The resin composition extruded from the extruder is directly cut and pelletized. Alternatively, the composition is formed into strands which are then cut into pellets by a pelletizer. Further, when the influence of exterior dust or the like needs to be reduced, the atmosphere surrounding the extruder is preferably cleaned. Further, in production of the pellets, narrowing of shape distribution of pellets, a reduction of miscuttings, a reduction of fine powder produced during conveyance or transportation, and a reduction of bubbles (vacuum bubbles) produced in strands or pellets can be carried out as appropriate by use of various methods that have been proposed for polycarbonate resins for optical disks and optical cyclic polyolefin resins. By these, high cycling of molding and a reduction in the frequency of occurrence of defects such as silver can be achieved.

The pellet may take a common shape such as a cylinder, prism or sphere but is more suitably in a cylindrical shape. The diameter of the cylinder is preferably 1 to 5 mm, more preferably 1.5 to 4 mm, much more preferably 2 to 3.3 mm. Meanwhile, the length of the cylinder is preferably 1 to 30 mm, more preferably 2 to 5 mm, much more preferably 2.5 to 3.5 mm.

(Molded Article)

The resin composition of the present invention can generally form into various molded articles by injection-molding pellets produced as described above. Further, without forming into pellets, the resin composition can be melt-kneaded in an extruder and directly formed into a sheet, film, contour extruded article, a direct-blow molded article or injection-molded article.

In injection molding, not only a general molding method but also injection compression molding, injection press molding, gas assist injection molding, foam molding (including one involving infusion of supercritical fluid), insert molding, in-mold coating molding, insulated metal molding, rapid heating-cooling molding, two-color molding, sandwich molding and ultrafast injection molding can be used as appropriate according to purposes to obtain a molded article. The advantages of these various molding methods are already widely known. Further, either of a cold runner method and a hot runner method can be selected for the molding.

The resin composition of the present invention can also be used in the form of a contour extruded article, sheet or film by extrusion. To form the sheet or film, inflation, calendaring, casting or the like can also be used. Further, the resin composition of the present invention can also be molded into a heat shrinkable tube by subjecting the resin composition to a specific stretching operation. Further, the resin composition of the present invention can also be formed into a molded article by rotational molding, blow molding or the like.

The resin composition of the present invention is useful for various electronic/electric parts. Illustrative examples of parts incorporated in electric/electronic equipments such as OA equipments and household electric appliances include various connectors, outlets, plugs used for mutual connection of electric wires, mutual connection of electric insulated wires or connection of electric/electronic equipment and an electric wire, various switches for switching between connection and disconnection of circuit, various electronic devices for controlling the energization status of circuit, and various electromechanical parts incorporated in other electric/electronic equipments. Specific examples thereof include connectors, relays, condenser cases, switches, trans bobbins, terminal blocks, printed circuit boards, cooling fans, valves, shield boards, various buttons, various handles, various sensors, small motor parts, various sockets, tuner parts, fuse cases, fuse holders, brush holders, breaker parts, electromagnetic switches, deflection yokes, flyback transformers, keytops, rollers, bearings, and lamp housings.

Further, the resin composition of the present invention is useful for exterior parts for various electric/electronic equipments. Illustrative examples of the exterior parts for electric/electronic equipments include exterior parts for personal computers such as desktop personal computers and notebook-size personal computers, exterior parts for OA equipments such as printers, copying machines, scanners and fax machines (including their complex machines), exterior parts for displays (such as CRT, liquid crystal, plasma, projector and organic electroluminescence), exterior parts for mice and the like, switch mechanism parts such as keys in keyboards and various switches, and exterior parts for game machines (such as home video game machines, arcade video game machines, pinball machines and slot machines).

(Function Imparting Agent)

Further, to the resin composition of the present invention, various function imparting agents may be added according to applications. Illustrative examples thereof include a plasticizer, light stabilizer, heavy metal deactivator, lubricant, antistatic agent, and ultraviolet absorber. Further, in the resin composition of the present invention, various organic and inorganic fillers, fibers and the like can be used in a composite form according to applications. Illustrative examples of the fillers include carbon, talc, mica, wollastonite, montmorillonite and hydrotalcite. Illustrative examples of the fibers include natural fibers such as kenaf, various synthetic fibers, glass fibers, quartz fibers, and carbon fibers.

Further, the resin composition of the present invention can also be used in such a manner that it is mixed and alloyed with polymers, synthetic resins, rubber and the like comprising various biogenic matters, such as aliphatic polyester such as polylactic acid, aromatic polyester, aromatic polycarbonate, polyamide, polystyrene, polyolefin, polyacryl, ABS, polyurethane and the like.

EXAMPLES

The present invention will be further described with reference to the following Examples. However, the present invention shall not be limited by these Examples in any way. Further, "parts" in Examples indicates "parts by weight", and "%" indicates "% by weight". Evaluations were made in accordance with the following methods.

(1) Specific Viscosity $\eta_{sp}$

Pellets were dissolved in methylene chloride to a concentration of about 0.7 g/dL and measured at 20° C. by use of an Ostwald viscosimeter (device name: RIGO AUTO VISCOSIMETER TYPE VMR-0525•PC). Specific viscosity $\eta_{sp}$ was determined from the following formula.

$$\eta_{sp} = t/t_o - 1$$

t: flow time of sample solution
$t_o$: flow time of solvent only (2) Glass Transition Temperature
This was measured by DSC (type: DSC2910) of TA Instruments Co., Ltd. using pellets.

(3) 5% Weight Reduction Temperature of Polycarbonate Resin
This was measured by TGA (type: TGA2950) of TA Instruments Co., Ltd. using pellets.

(4) Thermal Decomposition Temperature (5% Weight Reduction Temperature) of Phosphorus Compound
This was measured by TGA (type: TGA2950) of TA Instruments Co., Ltd. using a phosphorus compound.

(5) Melt Viscosity
Melt viscosity at 600 sec$^{-1}$ was read from a Shear Rate/Viscosity curve resulting from measuring by use of a capillary rheometer (Capirograph model 1D) of Toyo Seiki Seisakusho, Ltd. at a capillary length of 10.0 mm, a capillary diameter of 1.0 mm and a measurement temperature of 250° C. with a measuring speed being changed arbitrarily.

(6) Terminal Modified Group Content
$^1$H-NMR in a dichloroform solution of pellets was measured by use of JNM-AL400 of JEOL Ltd, and a terminal modified group content was determined from the integral ratio between specific protons derived from an ether diol and specific protons derived from a terminal hydroxy compound. The terminal modified group content was determined from the following formula.

$$\text{Terminal Modified Group Content} = [Rt] \times ([Mt] \times [Re])/[Me] \times 100 \text{ (wt \%)}$$

Rt: ratio of terminal hydroxy compound to ether diol determined from integral ratio of $^1$H-NMR
Mt: molecular weight of terminal hydroxy compound constituent
Re: composition ratio of ether diol in the main chain determined from integral ratio of $^1$H-NMR
Me: molecular weight of ether diol constituent (7) Flammability
A 1.6-mm (1/16-inch) test piece was molded. This was used as a measure for evaluation of flame retardancy, and an evaluation was made in accordance with a vertical flame test provided in the U.S. UL standard UL-94.

(8) Flexural Modulus
After pellets were dried at 120° C. for 12 hours, they were molded into a flexural test piece by use of JSWJ-75EIII of Japan Steel Works, Ltd. at a cylinder temperature of 250° C. and a mold temperature of 90° C. A flexural test was conducted in accordance with ISO178.

(9) Deflection Temperature Under Load (0.45 MPa)
Deflection temperature under low load (0.45 MPa) defined in ISO 75 was measured by use of the flexural test piece prepared in the above (8).

(10) Moldability
Molding was carried out by use of JSWJ-75EIII of Japan Steel Works, Ltd., and the shape of the sample plate having a thickness of 2 mm was visually evaluated (mold temperature: 80 to 110° C., cylinder temperature: 230 to 260° C.). Evaluation criteria are as follows.

○: No turbidity, cracks, sinks, and silver streak caused by decomposition are observed.

x: Turbidity, cracks, sinks, or silver streak caused by decomposition is observed.

Reference Example 1

Production of Polycarbonate Resin 7,307 parts by weight (50 mol) of isosorbide and 10,709 parts by weight (50 mol) of diphenyl carbonate were charged into a reactor. 4.8 parts by weight ($1\times10^{-4}$ mol per mol of the diphenyl carbonate component) of tetramethylammonium hydroxide as a polymerization catalyst and $5.0\times10^{-3}$ parts by weight ($0.25\times10^{-6}$ mol per mol of the diphenyl carbonate component) of sodium hydroxide were charged into the reactor. The charged materials were heated to 180° C. in a nitrogen atmosphere at normal pressure to be molten.

Under agitation, the pressure inside the reactor was gradually reduced for 30 minutes to $13.3\times10^{-3}$ MPa, while produced phenol was being distilled off. In this state, the materials were allowed to react for 20 minutes and then heated to 200° C. Thereafter, the pressure inside the reactor was gradually reduced for 20 minutes, and the materials were allowed to react at $4.00\times10^{-3}$ MPa for 20 minutes while phenol was being distilled off. Then, the materials were heated to 220° C. and allowed to react for 30 minutes at the temperature, and then heated to 250° C. and allowed to react for 30 minutes at the temperature.

Then, the pressure inside the reactor was gradually reduced, and the materials were allowed to react at $2.67\times10^{-3}$ MPa for 10 minutes and then at $1.33\times10^{-3}$ MPa for 10 minutes. The pressure inside the reactor was further reduced, and when the pressure reached $4.00\times10^{-5}$ MPa, the materials were gradually heated to 260° C. and eventually allowed to react at 260° C. and $6.66\times10^{-5}$ MPa for 1 hour. After the reaction, the polymer was pelletized to obtain pellets having a specific viscosity of 0.33. This pellet had a glass transition temperature (Tg) of 165° C. and a 5% weight reduction temperature (Td) of 355° C.

Reference Example 2

Production of Polycarbonate Resin

Pellets having a specific viscosity of 0.23 were obtained in the same manner as in Reference Example 1 except that the materials were eventually allowed to react at 255° C. and $6.66\times10^{-5}$ MPa for 30 minutes. This pellet had a glass transition temperature (Tg) of 158° C. and a 5% weight reduction temperature (Td) of 353° C.

Reference Example 3

Production of Polycarbonate Resin 7,307 parts by weight (50 mol) of isosorbide, 10,923 parts by weight (51 mol) of diphenyl carbonate and 270 parts by weight (1.0 mol) of stearyl alcohol were charged into a reactor. 4.7 parts by weight ($1\times10^{-4}$ mol per mol of the diphenyl carbonate component) of tetramethylammonium hydroxide as a polymerization catalyst and $4.0\times10^{-3}$ parts by weight ($0.20\times10^{-6}$ mol per mol of the diphenyl carbonate component) of sodium hydroxide were charged into the reactor. The charged materials were heated to 180° C. in a nitrogen atmosphere at normal pressure to be molten.

Under agitation, the pressure inside the reactor was gradually reduced for 30 minutes to $13.3\times10^{-3}$ MPa, while produced phenol was being distilled off. In this state, the materials were allowed to react for 20 minutes and then heated to 200° C. Thereafter, the pressure inside the reactor was gradually reduced for 20 minutes, and the materials were allowed to react at $4.00\times10^{-3}$ MPa for 20 minutes while phenol was being distilled off. Then, the materials were heated to 220° C. and allowed to react for 30 minutes at the temperature, and then heated to 250° C. and allowed to react for 30 minutes at the temperature.

Then, the pressure inside the reactor was gradually reduced, and the materials were allowed to react at $2.67\times10^{-3}$ MPa for 10 minutes and then at $1.33\times10^{-3}$ MPa for 10 minutes. The pressure inside the reactor was further reduced, and when the pressure reached $4.00\times10^{-5}$ MPa, the materials were gradually heated to 260° C. and eventually allowed to react at 260° C. and $6.66\times10^{-5}$ MPa for 1 hour. After the reaction, the polymer was pelletized to obtain pellets having a specific viscosity of 0.31. This pellet had a terminal modified group content of 1.7 wt %, a glass transition temperature of 150° C. and a 5% weight reduction temperature of 362° C.

Reference Example 4

Production of Polycarbonate Resin 7,234 parts by weight (49.5 mol) of isosorbide, 163 parts by weight (0.5 mol) of 1,1-bis(4-hydroxyphenyl)decane and 11,030 parts by weight (51.5 mol) of diphenyl carbonate were charged into a reactor. 9.4 parts by weight ($2\times10^{-4}$ mol per mol of the diphenyl carbonate component) of tetramethylammonium hydroxide as a polymerization catalyst and $5.2\times10^{-2}$ parts by weight ($2.5\times10^{-6}$ mol per mol of the diphenyl carbonate component) of sodium hydroxide were charged into the reactor. The charged materials were heated to 180° C. in a nitrogen atmosphere at normal pressure to be molten.

Under agitation, the pressure inside the reactor was gradually reduced for 30 minutes to $13.3\times10^{-3}$ MPa, while produced phenol was being distilled off. In this state, the materials were allowed to react for 20 minutes and then heated to 200° C. Thereafter, the pressure inside the reactor was gradually reduced for 20 minutes, and the materials were allowed to react at $4.00\times10^{-3}$ MPa for 20 minutes while phenol was being distilled off. Then, the materials were heated to 220° C. and allowed to react for 30 minutes at the temperature, and then heated to 250° C. and allowed to react for 30 minutes at the temperature.

Then, the pressure inside the reactor was gradually reduced, and the materials were allowed to react at $2.67\times10^{-3}$ MPa for 10 minutes and then at $1.33\times10^{-3}$ MPa for 10 minutes. The pressure inside the reactor was further reduced, and when the pressure reached $4.00\times10^{-5}$ MPa, the materials were gradually heated to 260° C. and eventually allowed to react at 260° C. and $6.66\times10^{-5}$ MPa for 1 hour. After the reaction, the polymer was pelletized to obtain pellets having a specific viscosity of 0.38. This pellet had a glass transition temperature of 158° C. and a 5% weight reduction temperature of 356° C.

Reference Example 5

Production of Copolymerized Polycarbonate Resin

Pellets having a specific viscosity of 0.28 were obtained in the same manner as in Reference Example 1 except that 6,722 parts by weight (46 mol) of isosorbide, 10,709 parts by weight (50 mol) of diphenyl carbonate and 304 parts by weight (4 mol) of 1,3-propanediol were used. This pellet had a glass transition temperature (Tg) of 146° C. and a 5% weight reduction temperature (Td) of 342° C.

Examples 1 to 9 and Comparative Examples 1 to 3

Resin compositions shown in Table 1 were prepared in the following manner. Components in amounts shown in Table 1 were weighed and mixed uniformly, and the mixture was charged into an extruder to prepare a resin composition. As the extruder, a 15-mm-φ vented twin-screw extruder (KZW15-25MG of TECHNOVEL CORPORATION) was used. Extrusion conditions comprised a discharge rate of 14 kg/h, a screw rotation speed of 250 rpm and a degree of vacuum at the vent of 3 kPa, and the extrusion temperature was 250° C. from a first feed port to a dice, whereby pellets were obtained. After the obtained pellets were dried at 100° C. for 12 hours, various physical properties were evaluated. Each component shown in Tables are as follows.
(Component A)
A-1: Polycarbonate resin pellets produced in Reference Example 1
A-2: Polycarbonate resin pellets produced in Reference Example 2
A-3: Polycarbonate resin pellets produced in Reference Example 3
A-4: Polycarbonate resin pellets produced in Reference Example 4
A-5: Polycarbonate resin pellets produced in Reference Example 5
(Component B)
B-1: BCA (10-benzyl-9,10-dihydro-9-oxa-10-phosphaphenanthrene-10-oxide; product of Sanko Co., Ltd.) thermal decomposition temperature=265° C.
B-2: HCA (9,10-dihydro-9-oxa-10-phosphaphenanthrene-10-oxide; product of Sanko Co., Ltd.) thermal decomposition temperature=245° C.
B-3: Exolit AP-462 (product of Hoechst AG), thermal decomposition temperature=314° C.
(Component N: Flame Retardant other than Component B)
N-1: Exolit OP-1312 (organophosphorus compound {product of Clariant K. K.}), thermal decomposition temperature=415° C.
N-2: PX-200 (condensed phosphoric ester {product of Daihachi Chemical Industry Co., Ltd., resorcinol-bis(dixylyl phosphate)}), thermal decomposition temperature=346° C.
(Component C)
C-1: POLYFLON MPA FA500 (product of Daikin Industries, Ltd.)
(Other Components)
L-1: glycerin monostearate (product of Riken Vitamin Co., Ltd., RIKEMAL S-100A)
S-1: bis(2,6-di-tert-butyl-4-methylphenyl)pentaerythritol diphosphite (product of ADEKA CORPORATION, ADK STAB PEP-36)

Molding of Electronic/Electric Device (Connector)

Example 10

According to composition shown in Table 2, a polycarbonate resin and various additives were fed into a 15-mm-φ vented twin-screw extruder [KZW15-25MG of TECHNOVEL CORPORATION] and melt-extruded at a cylinder temperature of 250° C., a screw rotation speed of 250 rpm, a discharge rate of 14 kg/h and a degree of vacuum at the vent of 3 kPa to be pelletized.

The obtained pellets were dried by use of a hot-air-circulating dryer at 100° C. for 12 hours. Then, test pieces for testing deflection temperature under load, a bending property and flame retardancy were molded by an injection molding machine (JSWJ-75EIII of Japan Steel Works, Ltd.) at cylinder temperature shown in Table 2, a mold temperature of 90° C. and a molding cycle of 180 seconds. Also, a connector having an outside dimension of 20 mm×5 mm×5 mm and adapted for 24 pins, the pins arranged in a form of 12 pins×2 rows, was molded at a cylinder temperature of 250° C., a mold temperature of 90° C. and a molding cycle of 180 seconds. A bisphenol A-polycarbonate resin was molded into a connector at a cylinder temperature of 300° C., a mold temperature of 90° C. and a molding cycle of 180 seconds, and a poly-L-lactic acid was molded into a connector at a cylinder temperature of 200° C., a mold temperature of 25° C. and a molding cycle of 300 seconds. Various properties were measured by use of these molded articles. The injection moldabilities and measurement results of the molded articles are shown in Tables 2 and 3. Various evaluations were made in accordance with the following methods.
(1) Heat Resistance: Deflection temperature under load was measured under a load of 1.80 MPa in accordance with 15075-1 and 2.
(2) Flexural Strength, Flexural Modulus: A bending property was measured in accordance with ISO178 (test piece shape: 80 mm in length×10 mm in width×4 mm in thickness).
(3) Flammability: A flame retardancy rank at a test piece thickness of 3.2 mm was evaluated in accordance with a method (UL94) provided by Underwriters Laboratories Inc. in the U.S.
(4) Chemical Resistance: The connector molded article was immersed in toluene, xylene, acetone, trichloroethane at room temperature for 24 hours, and its surface condition was observed.
(5) Hydrolysis Resistance: After the connector molded article was treated in a thermo-hygrostat at 80° C. and a relative humidity of 90% for 10 days, its molecular weight was evaluated by a retention rate with respect to the value before the treatment.

Further, the following resins were used as comparative resins.
(Comparative-1) Bisphenol A-polycarbonate resin: L-1250 (product of Teijin Chemicals Ltd.)
(Comparative-2) Poly-L-lactic acid resin: LACER H-100J (product of Mitsui Chemicals, Inc.)

Molding of Exterior Part for Electric/Electronic Device

Examples 11 and 12

According to composition shown in Table 4, a polycarbonate resin and various additives were fed into a 30-mm-φ vented twin-screw extruder [TEX30XSST of Japan Steel Works, Ltd.] and melt-extruded at a cylinder temperature of 260° C., a screw rotation speed of 150 rpm, a discharge rate of 20 kg/h and a degree of vacuum at the vent of 3 kPa to be pelletized.

As for screw configuration, a first kneading zone (comprising two forward kneading disks, one forward rotor, one backward rotor and one backward kneading disk) was provided before a side feeder position, and a second kneading zone (comprising one forward rotor and one backward rotor) was provided after the side feeder position.

The obtained pellets were dried by use of a hot-air-circulating dryer at 100° C. for 12 hours. Then, test pieces for testing deflection temperature under load, a bending property and flame retardancy were molded by an injection molding machine (IS-150EN of TOSHIBA MACHINE CO., LTD.) at cylinder temperature shown in Table 4, a mold temperature of 90° C. and a molding cycle of 180 seconds.

Figure 1:
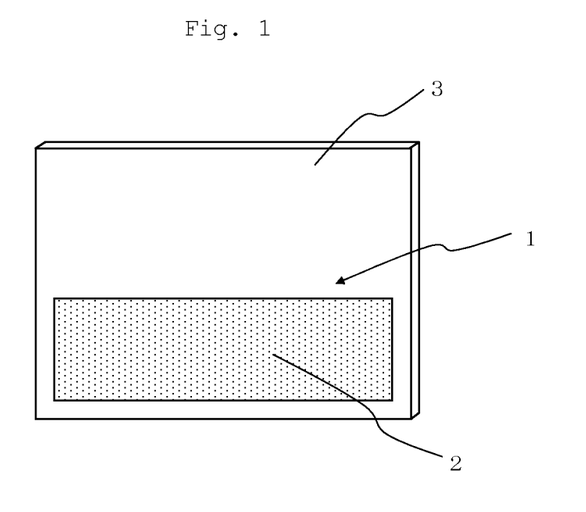
FIG. 1 is a schematic perspective view of the front side of a molded article simulating a notebook-size personal computer housing produced in Examples (length=178 mm, width=245 mm, edge height=10 mm, thickness=1.2 mm).
Figure 2:
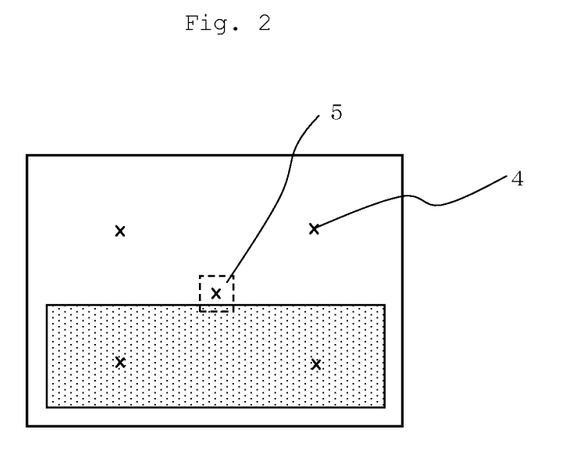
FIG. 2 is a schematic front view of the front side of the molded article simulating a notebook-size personal computer housing produced in the Examples, indicating positions of gates and a portion of which a sample for evaluation is cut out.
Figure 3:
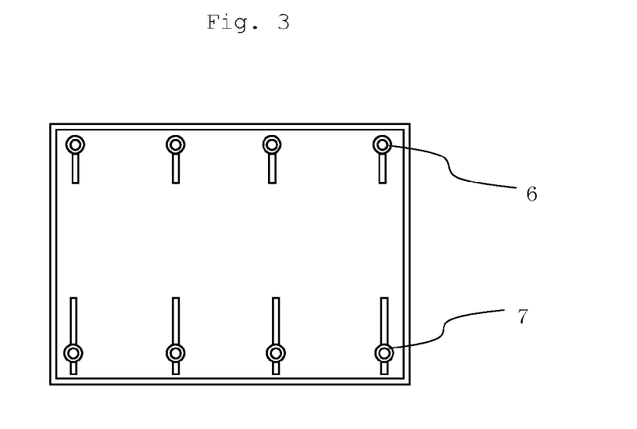
FIG. 3 is a schematic front view of the back side of the molded article simulating a notebook-size personal computer housing produced in the example, indicating ribbed bosses (matte surface parts have bosses having ribs on the upper and lower sides).

Then, a simulated molded article of an exterior part for a notebook-size personal computer shown in FIG. 1 was molded from the dried pellets by use of an injection molding machine (ULTRA220-NIVA of Sumitomo Heavy Industries, Ltd.) having a cylinder inner diameter of 50 mm at a cylinder temperature of 250° C. and a mold temperature of 90° C., and a sample was taken from the central portion.

Figure 4:
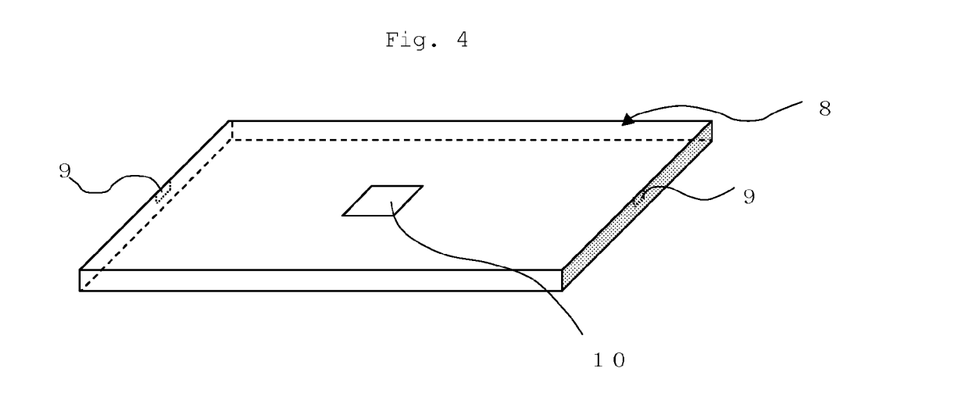
FIG. 4 is a schematic perspective view of the front side of a molded article simulating an exterior part for large-size OA equipment produced in the Examples (outside dimension: length=500 mm, width=600 mm, thickness=2.5 mm).

Further, a simulated molded article of an exterior part for large-size OA equipment shown in FIG. 4 was molded from the dried pellets by use of an injection molding machine (J1300E-05 of Japan Steel Works, Ltd.) at a cylinder temperature of 250° C. and a mold temperature of 90° C., and a sample was taken from the central portion.

Figure 5:
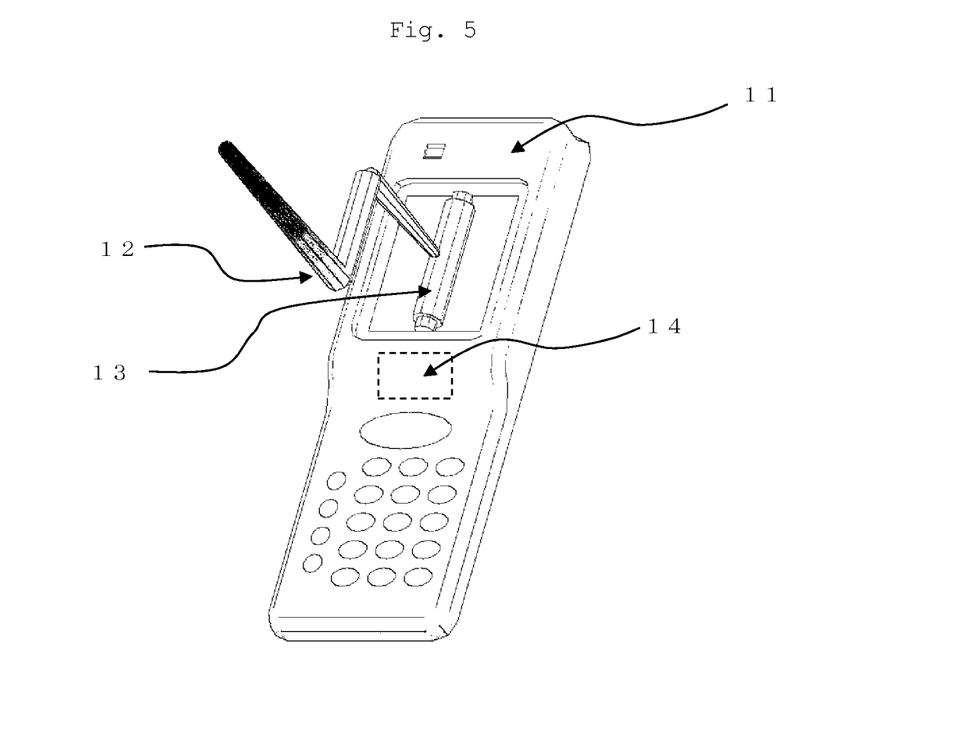
FIG. 5 is a schematic perspective view of the front side of a molded article simulating an exterior part for a cellular phone produced in the Examples (outside dimension: length=100 mm, width=35 mm, thickness=1.5 mm).

In addition, a simulated molded article of an exterior part for a cellular phone shown in FIG. 5 was molded from the dried pellets by use of an injection molding machine (IS-150EN of TOSHIBA MACHINE CO., LTD.) at a cylinder temperature of 250° C. and a mold temperature of 90° C., and a sample was taken from the central portion.

A bisphenol A-polycarbonate resin for property comparison was molded at a cylinder temperature of 300° C., a mold temperature of 90° C. and a molding cycle of 180 seconds, and a poly-L-lactic acid for property comparison was molded at a cylinder temperature of 200° C., a mold temperature of 25° C. and a molding cycle of 300 seconds.

Various properties were measured by use of these molded articles and samples. Their injection moldabilities and measurement results are shown in Tables 4 to 8. Various evaluations were made in accordance with the following methods.

(1) Heat Resistance: Deflection temperature under load was measured under a load of 1.80 MPa in accordance with 15075-1 and 2.

(2) Flexural Strength, Flexural Modulus: A bending property was measured in accordance with ISO178 (test piece shape: 80 mm in length×10 mm in width×4 mm in thickness).

(3) Flammability: A flame retardancy rank at a test piece thickness of 1.6 mm or 3.2 mm was evaluated in accordance with a method (UL94) provided by Underwriters Laboratories Inc. in the U.S.

(4) Chemical Resistance: The molded article cut out of the simulated molded article of the exterior part for the electric/electronic device was immersed in toluene, xylene, acetone, trichloroethane at room temperature for 24 hours, and its surface condition was observed.

(5) Hydrolysis Resistance: After the molded article cut out of the simulated molded article of the exterior part for the electric/electronic device was treated in a thermo-hygrostat at 80° C. and a relative humidity of 90% for 10 days, its molecular weight was evaluated by a retention rate with respect to the value before the treatment.

(6) Pencil Scratch Value

A pencil scratch value by handwriting was measured by using a smooth plate molded article having a thickness of 1 mm in accordance with a method provided in JIS K5400.

In addition to the above components, the following component is used.

(G-1) Talc (HiTalc Premium HTP ultra 5C of Tomoe Engineering Co., Ltd.)

TABLE 1

| | | | | Ex. 1 | Ex. 2 | Ex. 3 | Ex. 4 | Ex. 5 | Ex. 6 |
|---|---|---|---|---|---|---|---|---|---|
| Composition | Component A | A-1 | parts by weight | 100 | | 100 | 100 | 100 | |
| | | A-2 | parts by weight | | 100 | | | | |
| | | A-3 | parts by weight | | | | | | 100 |
| | | A-4 | parts by weight | | | | | | |
| | | A-5 | parts by weight | | | | | | |
| | Component B | B-1 | parts by weight | 4 | 3 | | | | 3 |
| | | B-2 | parts by weight | | | 5 | | | |
| | | B-3 | parts by weight | | | | 50 | 35 | |
| | Component C | C-1 | parts by weight | | | | | 0.4 | |
| | Flame Retardant other than Component B | N-1 | parts by weight | | | | | | |
| | | N-2 | parts by weight | | | | | | |
| | Others | L-1 | parts by weight | 0.1 | 0.1 | 0.05 | 0.05 | 0.05 | 0.05 |
| | | S-1 | parts by weight | 0.05 | | | 0.1 | 0.1 | 0.1 |
| Evaluation | 5% Weight Reduction Temperature | | ° C. | 340 | 341 | 328 | 330 | 333 | 339 |
| | Melt Viscosity | | ×10³ Pa · s | 1.0 | 0.5 | 0.1 | 1.5 | 1.2 | 0.6 |
| | Moldability | | | ○ | ○ | ○ | ○ | ○ | ○ |
| | Flammability | | kJ/m² | V-2 | V-2 | V-2 | V-0 | V-0 | V-2 |
| | Flexural Modulus | | MPa | 3900 | 3910 | 4150 | 4420 | 4320 | 3750 |
| | Deflection Temperature under Load (0.45 MPa) | | ° C. | 143 | 138 | 101 | 139 | 136 | 127 |

| | | | | Ex. 7 | Ex. 8 | Ex. 9 | C. Ex. 1 | C. Ex. 2 | C. Ex. 3 |
|---|---|---|---|---|---|---|---|---|---|
| Composition | Component A | A-1 | parts by weight | | | | 100 | 100 | 100 |
| | | A-2 | parts by weight | | | | | | |
| | | A-3 | parts by weight | 100 | | | | | |
| | | A-4 | parts by weight | | 100 | | | | |
| | | A-5 | parts by weight | | | 100 | | | |
| | Component B | B-1 | parts by weight | | | | | | |
| | | B-2 | parts by weight | | | | | | |
| | | B-3 | parts by weight | 40 | 30 | 20 | | | |
| | Component C | C-1 | parts by weight | 0.4 | 0.4 | 0.4 | | | |
| | Flame Retardant other than Component B | N-1 | parts by weight | | | | | 30 | |
| | | N-2 | parts by weight | | | | | | 15 |
| | Others | L-1 | parts by weight | 0.05 | 0.05 | 0.05 | 0.05 | 0.05 | 0.05 |
| | | S-1 | parts by weight | 0.1 | 0.2 | 0.3 | | | |

TABLE 1-continued

| Evaluation | | | | | | | | |
|---|---|---|---|---|---|---|---|---|
| 5% Weight Reduction Temperature | °C. | 331 | 340 | 330 | 355 | 340 | 334 | |
| Melt Viscosity | ×10³ Pa·s | 0.9 | 1.0 | 0.3 | 1.6 | 1.2 | — | |
| Moldability | | ○ | ○ | ○ | ○ | ○ | — | |
| Flammability | kJ/m² | V-0 | V-0 | V-0 | not-V | not-V | — | |
| Flexural Modulus | MPa | 4010 | 3990 | 4540 | 3760 | 4940 | — | |
| Deflection Temperature under Load (0.45 MPa) | °C. | 129 | 133 | 104 | 146 | 140 | — | |

Ex.: Example,
C. Ex.: Comparative Example

TABLE 2

| | Composition (part by weight) | | | | Cylinder Temperature (°C.) | Moldability | Properties | | | |
|---|---|---|---|---|---|---|---|---|---|---|
| | | | | | | | Deflection Temperature under Load (°C.) | Flexural Strength (MPa) | Flexural Modulus (MPa) | Flame Retardancy UL94 |
| | Component A | Components B, C | S-1 | L-1 | | | | | | |
| Ex. 10 | 100 (A-1) | 60 (B-3) 0.6 (C-1) | 0.1 | 0.05 | 250 | Good molded article is moldable | 142 | 88 | 4300 | V-0 |

Ex.: Example

TABLE 3

| | Chemical Resistance of Connector ○: No Change, X: Remarkable Change such as Swelling | | | | Hydrolysis Resistance of Connector Molecular Weight Retention Rate (%) |
|---|---|---|---|---|---|
| | Toluene | Xylene | Acetone | Trichloroethane | |
| Ex. 10 | ○ | ○ | ○ | ○ | 91 |
| Bisphenol A Polycarbonate | X | X | X | X | 95 |
| Poly-L-Lactic Acid | X | X | X | X | 12 |

Ex.: Example

TABLE 4

| | Composition (part by weight) | | | | | Cylinder Temperature (°C.) | Moldability |
|---|---|---|---|---|---|---|---|
| | Component A | Components B, C | G-1 | S-1 | L-1 | | |
| Example 11 | 100 (A-1) | 6 (B-1) | — | 0.1 | 0.05 | 250 | Good molded article is moldable |
| Example 12 | 100 (A-1) | 80 (B-3) 0.6 (C-1) | 15 | 0.1 | 0.05 | 250 | Good molded article is moldable |

TABLE 5

| | Properties | | | |
|---|---|---|---|---|
| | Deflection Temperature under Load (°C.) | Flexural Strength (MPa) | Flexural Modulus (MPa) | UL94 Flame Retardancy: Thickness |
| Example 11 | 120 | 116 | 4100 | V-2: 1.6 mm |
| Example 12 | 150 | 108 | 5540 | V-0: 3.2 mm |

TABLE 6

| | Chemical Resistance of Notebook-Size Personal Computer ○: No Change, X: Remarkable Change such as Swelling | | | | Hydrolysis Resistance of Notebook-Size Personal Computer Molecular Weight Retention |
|---|---|---|---|---|---|
| | Toluene | Xylene | Acetone | Trichloroethane | Rate (%) |
| Example 11 | ○ | ○ | ○ | ○ | 90 |
| Example 12 | ○ | ○ | ○ | ○ | 91 |
| Bisphenol A Polycarbonate | X | X | X | X | 94 |
| Poly-L-Lactic Acid | X | X | X | X | 11 |

| | Pencil Scratch Value of Notebook-Size Personal Computer |
|---|---|
| Example 11 | H |
| Example 12 | H |
| Bisphenol A Polycarbonate | 2B |
| Poly-L-Lactic Acid | 3B |

TABLE 7

| | Chemical Resistance of OA Molded Article ○: No Change, X: Remarkable Change such as Swelling | | | | Hydrolysis Resistance of OA Molded Article Molecular Weight Retention Rate |
|---|---|---|---|---|---|
| | Toluene | Xylene | Acetone | Trichloroethane | (%) |
| Example 11 | ○ | ○ | ○ | ○ | 90 |
| Example 12 | ○ | ○ | ○ | ○ | 91 |
| Bisphenol A Polycarbonate | X | X | X | X | 93 |
| Poly-L-Lactic Acid | X | X | X | X | 10 |

| | Pencil Scratch Value of OA Molded Article |
|---|---|
| Example 11 | H |
| Example 12 | H |
| Bisphenol A Polycarbonate | 2B |
| Poly-L-Lactic Acid | 3B |

TABLE 8

| | Chemical Resistance of Cellular Phone ○: No Change, X: Remarkable Change such as Swelling | | | | Hydrolysis Resistance of Cellular Phone Molecular Weight Retention Rate |
|---|---|---|---|---|---|
| | Toluene | Xylene | Acetone | Trichloroethane | (%) |
| Example 11 | ○ | ○ | ○ | ○ | 92 |
| Example 12 | ○ | ○ | ○ | ○ | 92 |
| Bisphenol A Polycarbonate | X | X | X | X | 95 |
| Poly-L-Lactic Acid | X | X | X | X | 12 |

| | Pencil Scratch Value of Cellular Phone |
|---|---|
| Example 11 | H |
| Example 12 | H |
| Bisphenol A Polycarbonate | 2B |
| Poly-L-Lactic Acid | 3B |

EFFECT OF THE INVENTION

The resin composition of the present invention has excellent flame retardancy. Further, the resin composition of the present invention is also excellent in heat resistance, thermal stability, rigidity, transparency and moldability. Thus, the molded article of the present invention is also excellent in flame retardancy, heat resistance, thermal stability, rigidity, transparency and moldability.

The resin composition of the present invention mainly contains an ether diol such as isosorbide. Therefore, it has a high biogenic matter content.

INDUSTRIAL APPLICABILITY

The resin composition of the present invention can be widely used in various applications including components for electric/electronic devices, components for OA equipment,

The invention claimed is:

1. A flame-retardant resin composition comprising
   (1) 3 to 30 parts by weight of phosphorus compound (component B) having a thermal decomposition temperature of not higher than 340° C.,
   (2) 0.01 to 0.5 part by weight of partial ester or full ester of polyhydric alcohol having 1 to 25 carbon atoms and saturated fatty acid having 10 to 30 carbon atoms, and
   (3) 100 parts by weight of polycarbonate resin (component A) that mainly comprises a recurring unit represented by the following formula (1):

(1)

wherein the component B is
an organophosphorus compound (B-1) represented by the following formula (3):

(3)

wherein R¹ represents a hydrogen atom, an aryl group having 6 to 15 carbon atoms or an aralkyl group having 7 to 20 carbon atoms, and R² and R³ each independently represent a hydrogen atom, a halogen atom, an alkyl group having 1 to 10 carbon atoms, an alkoxy group having 1 to 10 carbon atoms, an aryl group having 6 to 15 carbon atoms, an aryloxy group having 7 to 20 carbon atoms or an aralkyloxy group having 7 to 20 carbon atoms.

2. The resin composition of claim 1, wherein the recurring unit represented by the formula (1) is a recurring unit derived from isosorbide(1,4:3,6-dianhydro-D-sorbitol).

3. The resin composition of claim 1, wherein the polycarbonate resin (composition A) comprises the recurring unit represented by the formula (1) in an amount of 95 to 100 mol % based on the main chain.

4. The resin composition of claim 1, wherein the polycarbonate resin (composition A) is a resin that has been melt-polymerized in the presence of (i) a nitrogen-containing basic compound and (ii) an alkali (earth) metal compound.

5. The resin composition of claim 1, wherein the polycarbonate resin (composition A) comprises a terminal group represented by the following formula (5) or (6):

(5)

(6)

(wherein R⁴ represents an alkyl group having 4 to 30 carbon atoms, an aralkyl group having 7 to 30 carbon atoms, a perfluoroalkyl group having 4 to 30 carbon atoms, or the following formula (7):

(7)

(wherein R⁵, R⁶, R⁷, R⁸ and R⁹ each independently represent at least one group selected from the group consisting of an alkyl group having 1 to 10 carbon atoms, a cycloalkyl group having 6 to 20 carbon atoms, an alkenyl group having 2 to 10 carbon atoms, an aryl group having 6 to 10 carbon atoms and an aralkyl group having 7 to 20 carbon atoms, b is an integer of 0 to 3, and c is an integer of 4 to 100), Y represents at least one bond selected from the group consisting of a single bond, an ether bond, a thioether bond, an ester bond, an amino bond and an amide bond, and a is an integer of 1 to 5), in an amount of 0.3 to 9 wt % based on the main chain.

6. The resin composition of claim 1, wherein the polycarbonate resin (composition A) has a glass transition temperature (Tg) of 145 to 165° C. and a 5% weight reduction temperature (Td) of 320 to 400° C.

7. The resin composition of claim 1, showing a flame retardancy level according to UL-94 standard of at least V-2 in the form of a molded article having a thickness of 1.6 mm.

8. A molded article comprising the resin composition of claim 1.

* * * * *